United States Patent
Otozawa et al.

(10) Patent No.: US 8,193,277 B2
(45) Date of Patent: Jun. 5, 2012

(54) WATER/OIL REPELLENT COMPOSITION, METHOD FOR ITS PRODUCTION AND METHOD FOR TREATING ARTICLE

(75) Inventors: Nobuyuki Otozawa, Tokyo (JP); Kazunori Sugiyama, Tokyo (JP); Minako Shimada, Tokyo (JP); Yuuichi Oomori, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/278,292

(22) Filed: Oct. 21, 2011

(65) Prior Publication Data

US 2012/0037835 A1 Feb. 16, 2012

Related U.S. Application Data

(63) Continuation of application No. PCT/JP2010/057100, filed on Apr. 21, 2010.

(30) Foreign Application Priority Data

Apr. 23, 2009 (JP) .................................. 2009-105228

(51) Int. Cl.
*C08L 27/12* (2006.01)
(52) U.S. Cl. ...................................... 524/544; 524/545
(58) Field of Classification Search ................... 524/544, 524/545
See application file for complete search history.

(56) References Cited

U.S. PATENT DOCUMENTS

2005/0027063 A1* 2/2005 Audenaert et al. ............ 524/544
2011/0071248 A1  3/2011 Sugiyama et al.

FOREIGN PATENT DOCUMENTS

| JP | 2001-098033 | 4/2001 |
|---|---|---|
| JP | 2007-520583 | 7/2007 |
| WO | WO 2008/136435 | 11/2008 |
| WO | WO 2008/149676 | 12/2008 |

OTHER PUBLICATIONS

STIC Search Report dated Feb. 15, 2012.*
International Search Report issued Jun. 22, 2010 in PCT/JP2010/057100 filed Apr. 21, 2010.
U.S. Appl. No. 13/311,207, filed Dec. 5, 2011, Otozawa et al.
U.S. Appl. No. 13/278,292, filed Oct. 21, 2011, Otozawa et al.

* cited by examiner

*Primary Examiner* — Eisa Elhilo
(74) *Attorney, Agent, or Firm* — Oblon, Spivak, McClelland, Maier & Neustadt, L.L.P.

(57) ABSTRACT

To provide a water/oil repellent composition which is capable of imparting sufficient dynamic water repellency and post-air-drying water repellency to the surface of an article and which presents a low environmental impact, a method for its production and a method for treating an article.

A water/oil repellent composition which comprises a copolymer having structural units based on the following monomer (a) and structural units based on the following monomer (b) and having a mass average molecular weight of at least 40,000, and a medium, is used. Monomer (a): a compound represented by $(Z\text{—}Y)_n X$, wherein Z is a $C_{1\text{-}6}$ polyfluoroalkyl group or the like, Y is a bivalent organic group or the like, n is 1 or 2, and X is a polymerizable unsaturated group. Monomer (b): an olefin, a homopolymer of which has a glass transition temperature of from $-50°$ C. to $50°$ C.

11 Claims, No Drawings

WATER/OIL REPELLENT COMPOSITION, METHOD FOR ITS PRODUCTION AND METHOD FOR TREATING ARTICLE

TECHNICAL FIELD

The present invention relates to a water/oil repellent composition, a method for its production and a method for treating an article by means of the water/oil repellent composition.

BACKGROUND ART

As a method for imparting water/oil repellency to the surface of an article (such as a fiber product), a method of treating the article by means of a water/oil repellent composition composed of an emulsion having, dispersed in a medium, a copolymer having structural units based on a monomer having a polyfluoroalkyl group having at least 8 carbon atoms (a polyfluoroalkyl group will be hereinafter referred to as a $R^f$ group), has been known.

However, recently, EPA (US Environmental Protection Agency) has pointed out that a compound having a perfluoroalkyl group (a perfluoroalkyl group will be hereinafter referred to as a $R^F$ group) having at least 8 carbon atoms is likely to be decomposed in the environment or in vivo, and the decomposition product is likely to be accumulated, i.e. it presents a high environmental impact. Therefore, a copolymer for a water/oil repellent composition has been required which has structural units based on a monomer having a $R^f$ group having at most 6 carbon atoms, wherein structural units based on a monomer having a $R^f$ group having at least 8 carbon atoms are reduced as far as possible.

As a water/oil repellent composition containing such a copolymer, the following water/oil repellent composition has been, for example, proposed.

A water/oil repellent composition comprising a copolymer having structural units based on the following monomer (a), structural units based on the following monomer (b) and structural units based on the following monomer (c), and a medium (Patent Document 1):

Monomer (a): A monomer having a $R^F$ group having at most 6 carbon atoms.

Monomer (b): A (meth)acrylate having an alkyl group having from 20 to 30 carbon atoms.

Monomer (c): Vinylidene chloride

However, an article treated with such a water/oil repellent composition is insufficient in water repellency against water fallen from a height (rain fall) (hereinafter referred to as dynamic water repellency) and in water repellency after drying without forcibly heating after washing (hereinafter referred to as post-air-drying water repellency).

PRIOR ART DOCUMENT

Patent Document
  Patent Document 1: WO2008/136435

DISCLOSURE OF INVENTION

Technical Problem

The present invention provides a water/oil repellent composition which is capable of imparting sufficient dynamic water repellency and post-air-drying water repellency to the surface of an article and which presents a low environmental impact, a method for its production, and a method for treating an article.

Solution to Problem

The water/oil repellent composition of the present invention comprises a copolymer having structural units based on the following monomer (a) and structural units based on the following monomer (b) and having a mass average molecular weight of at least 40,000, and a medium:

monomer (a): a compound represented by the following formula (1):

wherein Z is a $C_{1-6}$ polyfluoroalkyl group or a group represented by the following formula (2), Y is a bivalent organic group or a single bond, n is 1 or 2, and X is, when n is 1, any one of the groups represented by the following formulae (3-1) to (3-5) and, when n is 2, any one of the groups represented by the following formulae (4-1) to (4-4):

wherein i is an integer of from 1 to 6, j is an integer of from 0 to 10, and each of $X^1$ and $X^2$ is a fluorine atom or a trifluoromethyl group;

wherein R is a hydrogen atom, a methyl group or a halogen atom, and φ is a phenylene group;

where R is a hydrogen atom, a methyl group or a halogen atom, and m is an integer of from 0 to 4;

monomer (b): an olefin, a homopolymer of which has a glass transition temperature of from −50 to 50° C.

The copolymer preferably further has structural units based on the following monomer (c):

monomer (c): a monomer having no polyfluoroalkyl group and having a crosslinkable functional group.

The molecular weight of the monomer (b) is preferably at most 150.

The monomer (a) is preferably a (meth)acrylate having a $C_{4-6}$ perfluoroalkyl group.

The method for producing a water/oil repellent composition of the present invention comprises polymerizing a monomer mixture comprising the above monomer (a) and the above monomer (b) in a solvent in the presence of a surfactant and a polymerization initiator, to obtain a copolymer having a mass average molecular weight of at least 40,000.

The monomer mixture preferably further contains the above monomer (c).

The method for treating an article of the present invention comprises treating an article with a treating liquid containing the water/oil repellent composition of the present invention.

The treating liquid preferably further contains a film-forming assistant.

The film-forming assistant is preferably a water-soluble organic solvent having a boiling point higher than that of the medium.

Advantageous Effects of Invention

The water/oil repellent composition of the present invention is capable of imparting sufficient dynamic water repellency and post-air-drying water repellency to the surface of an article, by using a copolymer having a high mass average molecular weight. Further, it presents a low environmental impact.

According to the method for producing a water/oil repellent composition of the present invention, it is possible to produce a water/oil repellent composition which is capable of imparting sufficient dynamic water repellency and post-air-drying water repellency to the surface of an article and which presents a low environmental impact.

According to the method for treating an article of the present invention, sufficient dynamic water repellency and post-air-drying water repellency can be imparted to the surface of an article, and it presents a low environmental impact.

DESCRIPTION OF EMBODIMENTS

In this specification, a compound represented by the formula (1) will be referred to as a compound (1). Compounds represented by other formulae will also be referred to in the same manner. Further, in this specification, a group represented by the formula (2) will be referred to as a group (2). Groups represented by other formulae will also be referred to in the same manner. Further, a (meth)acrylate in this specification means an acrylate or a methacrylate. Further, in this specification, a monomer means a compound having a polymerizable unsaturated group. Further, in this specification, a $R^f$ group is a group having some or all of hydrogen atoms in an alkyl group substituted by fluorine atoms, and a $R^F$ group is a group having all hydrogen atoms in an alkyl group substituted by fluorine atoms.

<Water/oil Repellent Composition>

The water/oil repellent composition of the present invention comprises a copolymer (A) and a medium, as essential components, and may further contain a surfactant or an additive, as the case requires.

(Copolymer (A))

The copolymer (A) is a copolymer which has structural units based on a monomer (a) and structural units based on a monomer (b) and may further have structural units based on a monomer (c) and structural units based on a monomer (d), as the case requires.

Monomer (a):

The monomer (a) is a compound (I). Here, in the formula (1), the boundary between Z and Y is determined so that the number of carbon atoms in Z becomes smallest.

$$(Z-Y)_n X \quad (1)$$

Z is a $C_{1-6}$ $R^f$ group (provided that the $R^f$ group may contain an etheric oxygen atom) or a group (2):

$$C_i F_{2i+1} O(CFX^1 CF_2 O)_j CFX^2- \quad (2)$$

wherein i is an integer of from 1 to 6, j is an integer of from 0 to 10, and each of $X^1$ and $X^2$ which are independent of each other, is a fluorine atom or a trifluoromethyl group.

The $R^f$ group is preferably a $R^F$ group. The $R^f$ group may be linear or branched, preferably linear.

Z may, for example, be the following groups:
F(CF$_2$)$_4$—,
F(CF$_2$)$_5$—,
F(CF$_2$)$_6$—,
(CF$_3$)$_2$CF(CF$_2$)$_2$—,
C$_k$F$_{2k+1}$O[CF(CF$_3$)CF$_2$O]$_h$—CF(CF$_3$)—, etc.
wherein k is an integer of from 1 to 6, and h is an integer of from 0 to 10.

Y is a bivalent organic group or a single bond.

The bivalent organic group is preferably an alkylene group. The alkylene group may be linear or branched. The alkylene group may have —O—, —NH—, —CO—, —S—, —SO$_2$—, —CD$^1$=CD$^2$- (wherein each of D$^1$ and D$^2$ which are independent of each other, is a hydrogen atom or a methyl group), etc.

Y may, for example, be the following groups.
—CH$_2$—,
—CH$_2$CH$_2$—,
—(CH$_2$)$_3$—,
—CH$_2$CH$_2$CH(CH$_3$)—,
—CH=CH—CH$_2$—,
—S—CH$_2$CH$_2$—,
—CH$_2$CH$_2$—S—CH$_2$CH$_2$—,
—CH$_2$CH$_2$SO$_2$—CH$_2$CH$_2$—,
—W—OC(O)NH-A-NHC(O)O—(C$_p$H$_{2p}$)—, etc.
wherein p is an integer of from 2 to 30.

A is a symmetric alkylene group having no branch, an arylene group or an aralkylene group and is preferably —C$_6$H$_{12}$—, -φ-CH$_2$-φ- or -φ- (wherein φ is a phenylene group).

W is any one of the following groups.
—SO$_2$N(R$^1$)—C$_d$H$_{2d}$—,
—CONHC$_d$H$_{2d}$—,
—CH(R$^{F1}$)—C$_e$H$_{2e}$—,
—C$_q$H$_{2q}$—
wherein R$^1$ is a hydrogen atom or a C$_{1-4}$ alkyl group, d is an integer of from 2 to 8, R$^{F1}$ is a C$_{1-20}$ perfluoroalkyl group, e is an integer of from 0 to 6, and q is an integer of from 1 to 20. R$^{F1}$ is preferably a C$_{1-6}$ perfluoroalkyl group, more preferably a C$_4$ or C$_6$ perfluoroalkyl group.

n is 1 or 2.

X is, when n is 1, any one of groups (3-1) to (3-5) and when n is 2, any one of groups (4-1) to (4-4):

$$-CR=CH_2 \quad (3\text{-}1)$$

$$-C(O)OCR=CH_2 \quad (3\text{-}2)$$

$$-OC(O)CR=CH_2 \quad (3\text{-}3)$$

$$-OCH_2\text{-}\phi\text{-}CR=CH_2 \quad (3\text{-}4)$$

$$-OCH=CH_2 \quad (3\text{-}5)$$

wherein R is a hydrogen atom, a methyl group or a halogen atom, and φ is a phenylene group.

$$-CH[-CH_2)_m CR=CH_2]- \quad (4\text{-}1)$$

$$-CH[-CH_2)_m C(O)OR=CH_2]- \quad (4\text{-}2)$$

$$-CH[-CH_2)_m OC(O)CR=CH_2]- \quad (4\text{-}3)$$

$$-OC(O)CH=CHC(O)O- \quad (4\text{-}4)$$

wherein R is a hydrogen atom, a methyl group or a halogen atom, and m is an integer of from 0 to 4.

The compound (I) is preferably a (meth)acrylate having a C$_{4-6}$ R$^F$ group from the viewpoint of e.g. the polymerizability with other monomers, the flexibility of the coating film containing the copolymer (A), the adhesion of the copolymer (A) to an article, the solubility in a medium and efficiency of the emulsion polymerization.

The compound (I) is preferably a compound wherein Z is a $C_{4-6}$ $R^F$ group, Y is a $C_{1-4}$ alkylene group, n is 1, and X is the group (3-3).

Monomer (b)

The monomer (b) is an olefin, a homopolymer of which has a glass transition temperature (hereinafter referred to as Tg) of from −50 to 50° C.

By the copolymer (A) having structural units based on the monomer (b), a decrease in the film-forming property can be suppressed and a homogeneous coating film can be formed even when the mass average molecular weight of the copolymer (A) is high.

A homopolymer of the monomer (b) has Tg of from −50 to 50° C., more preferably from −30 to 30° C.

Tg of the homopolymer of the monomer (b) is a glass transition point as measured by differential scanning calorimetry (heat flux DSC) (JIS K7121).

The molecular weight of the monomer (b) is preferably at most 150, more preferably at most 100. An olefin having a molecular weight of at most 150 has an effect of reducing the average cross sectional area of polymer chains composed of units having high molecular weights, such as a water/oil repellent composition. A small cross sectional area makes polymer chains be easily entangled with one another and is thereby expected to contribute to improvement in the strength of the coating film.

The monomer (b) may be the following compounds, and vinylidene chloride, 1,2-butadiene or chloroprene is preferred. Tg of homopolymers thereof and molecular weights are as follows.

Vinylidene chloride (Tg of homopolymer: −17° C., molecular weight: 97)

1,2-butadiene (Tg of homopolymer: −30° C., molecular weight: 54)

cis-chloroprene (Tg of homopolymer: −20° C., molecular weight: 88.5)

trans-chloroprene (Tg of homopolymer: −40° C., molecular weight: 88.5)

Monomer (c):

The monomer (c) is a monomer having no $R^f$ group and having a crosslinkable functional group.

By having structural units based on the monomer (c), the abrasion resistance will further be improved.

The crosslinkable functional group is preferably a functional group having at least one bond selected from a covalent bond, an ionic bond and a hydrogen bond, or a functional group capable of forming a crosslinked structure by an interaction of such a bond. Otherwise, a compound having an active organic group or an element such as hydrogen or halogen in its molecule may be used. Such a functional group is preferably a hydroxy group, an isocyanate group, a blocked isocyanate group, an alkoxysilyl group, an amino group, an alkoxymethylamide group, a silanol group, an ammonium group, an amide group, an epoxy group, an oxazoline group, a carboxy group, an alkenyl group, a sulfonic acid group or the like, particularly preferably a hydroxy group, a blocked isocyanate group, an amino group or an epoxy group.

The monomer (c) is preferably a (meth)acrylate, an acrylamide, a vinyl ether or a vinyl ester.

The monomer (c) may, for example, be the following compounds.

2-Isocyanateethyl (meth)acrylate, 3-isocyanatepropyl (meth)acrylate, 4-isocyanatebutyl (meth)acrylate, a 2-butanoneoxime adduct of 2-isocyanateethyl (meth)acrylate, a pyrazole adduct of 2-isocyanateethyl (meth)acrylate, a 3,5-dimethylpyrazole adduct of 2-isocyanateethyl (meth)acrylate, a 3-methylpyrazole adduct of 2-isocyanateethyl (meth)acrylate, an ε-caprolactam adduct of 2-isocyanateethyl (meth)acrylate, a 2-butanoneoxime adduct of 3-isocyanatepropyl (meth)acrylate, a pyrazole adduct of 3-isocyanatepropyl (meth)acrylate.

A 3,5-dimethylpyrazole adduct of 3-isocyanatepropyl (meth)acrylate, a 3-methylpyrazole adduct of 3-isocyanatepropyl (meth)acrylate, an ε-caprolactam adduct of 3-isocyanatepropyl (meth)acrylate, a 2-butanoneoxime adduct of 4-isocyanatebutyl (meth)acrylate, a pyrazole adduct of 4-isocyanatebutyl (meth)acrylate, a 3,5-dimethylpyrazole adduct of 4-isocyanatebutyl (meth)acrylate, a 3-methylpyrazole adduct of 4-isocyanatebutyl (meth)acrylate, an ε-caprolactam adduct of 4-isocyanatebutyl (meth)acrylate.

Methoxymethyl (meth)acrylamide, ethoxymethyl (meth)acrylamide, butoxymethyl (meth)acrylamide, diacetone acrylamide, γ-methacryloyloxypropyl trimethoxysilane, trimethoxy vinyl silane, vinyl trimethoxysilane, dimethylaminoethyl (meth)acrylate, diethylaminoethyl (meth)acrylate, dimethylaminopropyl (meth)acrylate, (meth)acryloylmorpholine, (meth)acryloyloxyethyl trimethylammonium chloride, (meth)acryloyloxypropyl trimethylammonium chloride, (meth)acrylamideethyl trimethylammonium chloride, (meth)acrylamidepropyl trimethylammonium chloride.

t-butyl (meth)acrylamide sulfonic acid, (meth)acrylamide, N-methyl (meth)acrylamide, N-methylol (meth)acrylamide, N-butoxymethyl (meth)acrylamide, diacetone (meth)acrylamide, glycidyl (meth)acrylate, 2-hydroxyethyl (meth)acrylate, 2-hydroxypropyl (meth)acrylate, 4-hydroxybutyl (meth)acrylate, 3-chloro-2-hydroxypropyl methacrylate, polyoxyalkylene glycol mono(meth)acrylate, (meth)acrylic acid, 2-(meth)acryloyloxyethyl succinic acid, 2-(meth)acryloyloxyhexahydrophthalic acid, 2-(meth)acryloyloxyethyl acid phosphate, allyl (meth)acrylate, 2-vinyl-2-oxazoline, a polycaprolactone ester of 2-vinyl-4-methyl-(2-vinyloxazoline)hydroxyethyl (meth)acrylate.

Tri(meth)allyl isocyanurate (T(M)AIC manufactured by Nippon Kasei Chemical Co., Ltd.), triallyl cyanurate (TAC manufactured by Nippon Kasei Chemical Co., Ltd.), phenylglycidylethyl acrylate tolylene diisocyanate (AT-600 manufactured by KYOEISHA CHEMICAL Co., Ltd.), 3-(methylethylketoxime)isocyanatemethyl-3,5,5-trimethylcyclohexyl(2-hydroxyethyl methacrylate) cyanate (TECH-COAT HE-6P manufactured by Kyoken Kasei), a polycaprolactone ester of hydroxyethyl (meth)acrylate (PLACCEL FA, FM series manufactured by Daicel Chemical Industries, Ltd.).

Vinyl momochloroacetate, 2-chloroethyl vinyl ether, 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 4-hydroxycyclohexyl vinyl ether, 1,6-hexanediol monovinyl ether, 1,4-cyclohexanedimethanol monovinyl ether, diethylene glycol monovinyl ether, triethylene glycol monovinyl ether, dipropylene glycol monovinyl ether, vinyl glycidyl ether, 2-aminoethyl vinyl ether, 3-aminopropyl vinyl ether, 2-aminobutyl vinyl ether, allyl vinyl ether, 1,4-butanediol divinyl ether, nonanediol divinyl ether, cyclohexanediol divinyl ether, cyclohexanedimethanol divinyl ether, triethylene glycol divinyl ether, trimethylolpropane trivinyl ether, pentaerythritol tetravinyl ether.

The monomer (c) is preferably N-methylol (meth)acrylamide, 2-hydroxyethyl (meth)acrylate, glycidyl (meth)acrylate, 3-chloro-2-hydroxypropyl methacrylate, a polycaprolactone ester of hydroxyethyl (meth)acrylate (PLACCEL FA or FM-series manufactured by Daicel Chemical Industries, Ltd.).

Monomer (d):

The monomer (d) is a monomer other than the monomers (a), (b) and (c).

The monomer (d) may, for example, be the following compounds.

Methyl (meth)acrylate, ethyl (meth)acrylate, propyl (meth)acrylate, butyl (meth)acrylate, cyclohexyl (meth)acrylate, 2-ethylhexyl (meth)acrylate, n-hexyl (meth)acrylate, benzyl (meth)acrylate, octyl (meth)acrylate, decyl methacrylate, 3-ethoxypropyl acrylate, methoxy-butyl acrylate, 2-ethylbutyl acrylate, 1,3-dimethylbutyl acrylate, 2-methylpentyl acrylate, n-propyl vinyl ether, isopropyl vinyl ether, n-butyl vinyl ether, isobutyl vinyl ether, 2-ethylhexyl vinyl ether, octadecyl vinyl ether, cyclohexyl vinyl ether.

Vinyl acetate, vinyl propionate, butene, isoprene, 1,4-butadiene, ethylene, propylene, vinyl ethylene, pentene, ethyl-2-propylene, butylethylene, cyclohexylpropylethylene, decylethylene, dodecylethylene, hexene, isohexylethylene, neopentylethylene, (1,2-diethoxycarbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentylacetoxyethylene, styrene, α-methylstyrene, p-methylstyrene, hexylstyrene, octylstyrene, nonylstyrene, vinyl chloride, vinyl fluoride, vinylidene fluoride, tetrafluoroethylene, trifluoroethylene, trifluorochloroethylene.

N,N-dimethyl (meth)acrylamide, vinyl alkyl ether, halogenated alkyl vinyl ether, vinyl alkyl ketone, aziridinylethyl (meth)acrylate, 2-ethylhexylpolyoxyalkylene (meth)acrylate, polyoxyalkylene di(meth)acrylate.

Crotonic acid alkylester, maleic acid alkylester, fumaric acid alkylester, citraconic acid alkylester, mesaconic acid alkylester, triallyl cyanurate, allyl acetate, N-vinylcarbazole, maleimide, N-methylmaleimide, a (meth)acrylate having silicone in its side chain, a (meth)acrylate having a urethane bond, a (meth)acrylate having a polyoxyalkylene chain having a $C_{1-4}$ alkyl group at its terminal, an alkylene di(meth)acrylate, etc.

The proportion of the structural units based on the monomer (a) is preferably from 20 to 99 mass %, more preferably from 40 to 95 mass %, particularly preferably from 60 to 90 mass %, based on the structural units (100 mass %) based on all monomers, from the viewpoint of the dynamic water repellency and the post-air-drying water repellency.

The proportion of the structural units based on the monomer (b) is preferably from 1 to 80 mass %, more preferably from 5 to 60 mass %, particularly preferably from 10 to 40 mass %, based on the structural units (100 mass %) based on all monomers, from the viewpoint of the dynamic water repellency and the post-air-drying water repellency.

The proportion of the structural units based on the monomer (c) is preferably from 0 to 20 mass % based on the structural units (100 mass %) based on all monomers, and from the viewpoint of the abrasion resistance, it is more preferably from 1 to 10 mass %, particularly preferably from 1 to 5 mass %.

The proportion of the structural units based on the monomer (d) is preferably from 0 to 10 mass %, more preferably from 5 mass %, basal on the structural units (100 mass %) based on all monomers.

In the present invention, the proportion of the structural units based on a monomer is obtained by the NMR analysis and the elemental analysis. In a case where it cannot be obtained by the NMR analysis and the elemental analysis, it may be calculated based on the charged amount of the monomer at the time of the production of a water/oil repellent composition.

The mass average molecular weight (Mw) of the copolymer (A) is at least 40,000, preferably at least 50,000, more preferably at least 80,000. When the mass average molecular weight (Mw) of the copolymer (A) is at least 40,000, good dynamic water repellency and post-air-drying water repellency will be obtained. On the other hand, the mass average molecular weight (Mw) of the copolymer (A) is preferably at most 1,000,000, particularly preferably at most 500,000, from the viewpoint of the film-forming property and the storage stability.

The number average molecular weight (Mn) of the copolymer (A) is preferably at least 20,000, particularly preferably at least 30,000. On the other hand, the number average molecular weight (Mn) of the copolymer (A) is preferably at most 500,000, particularly preferably at most 200,000.

The mass average molecular weight (Mw) and the number average molecular weight (Mn) of the copolymer (A) are a molecular weight calculated as polystyrene, as measured by gel permeation chromatography (GPC), and specifically measured by the following method.

The copolymer (A) is dissolved in a mixed solvent of a fluorinated solvent (manufactured by Asahi Glass Company, Limited, AK-225)/THF=6/4 (volume ratio) to obtain a 1 mass % solution, which is passed through a 0.2 μm filter to prepare a sample for analysis. With respect to the sample, the number average molecular weight (Mn) and the mass average molecular weight (Mw) are measured under the following conditions.

Measurement temperature: 37° C.
Injected amount: 50 uL
Outflow rate: 1 mL/min
Eluent: mixed solvent of a fluorinated solvent (manufactured by Asahi Glass Company, Limited, AK-225)/THF=6/4 (volume ratio)

(Medium)

The medium may, for example, be water, an alcohol, a glycol, a glycol ether, a halogenated compound, a hydrocarbon, a ketone, an ester, an ether, a nitrogen compound, a sulfur compound, an inorganic solvent or an organic acid. Among them, at least one medium selected from the group consisting of water, an alcohol, a glycol, a glycol ether and a glycol ester is preferred from the viewpoint of the dissolving power and the handling efficiency.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol, 3-heptanol or 1,4-butanediol.

The glycol and the glycol ether may, for example, be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, propylene glycol, glycol ether such as propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol or hexylene glycol. The halogenated compound may, for example, be a halogenated hydrocarbon or a halogenated ether.

The halogenated hydrocarbon may, for example, be a hydrochlorofluorocarbon, a hydrofluorocarbon or a hydrobromocarbon.

The halogenated ether may, for example, be a hydrofluoroether.

The hydrofluoroether may, for example, be a separation-type hydrofluoroether or a non-separation-type hydrofluoroether. The separation-type hydrofluoroether is a compound wherein a $R^F$ group or a perfluoroalkylene group, and an alkyl group or an alkylene group, are bonded via an etheric oxygen atom. The non-separation-type hydrofluoroether is a hydrofluoroether containing a partially fluorinated alkyl or alkylene group.

The hydrocarbon may, for example, be an aliphatic hydrocarbon, an alicyclic hydrocarbon or an aromatic hydrocarbon.

The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane or hexadecane.

The alicyclic hydrocarbon may, for example, be cyclopentane, methylcyclopentane, cyclohexane, methylcyclohexane or ethylcyclohexane.

The aromatic hydrocarbon may, for example, be benzene, toluene or xylene.

The ketone may, for example, be acetone, methyl ethyl ketone, 2-pentanone, 3-pentanone, 2-hexanone or methyl isobutyl ketone.

The ester may, for example, be methyl acetate, ethyl acetate, butyl acetate, methyl propionate, methyl lactate, ethyl lactate or pentyl lactate.

The ether may, for example, be diisopropyl ether, dioxane or tetrahydrofuran (hereinafter referred to as THF).

The nitrogen compound may, for example, be pyridine, N,N-dimethylformamide, N,N-dimethylacetamide or N-methylpyrrolidone.

The sulfur compound may, for example, be dimethylsulfoxide or sulfolane.

The inorganic solvent may, for example, be liquefied carbon dioxide.

The organic acid may, for example, be acetic acid, propionic acid, malic acid or lactic acid.

As the medium, one type may be used alone, or two or more types may be used as mixed. In a case where the medium is used as a mixture of two or more types, it is preferred to use it as mixed with water. By using a mixed medium, it is easy to control the solubility or dispersibility of the copolymer (A) and to adjust the penetrating property to an article, the wettability, the solvent-drying rate, etc. during the processing.
(Surfactant)

The surfactant may, for example, be a hydrocarbon type surfactant or a fluorinated surfactant, and each of which may, for example, be an anionic surfactant, a nonionic surfactant, a cationic surfactant, or an amphoteric surfactant.

As the surfactant, from the viewpoint of the dispersion stability, it is preferred to use a nonionic surfactant and a cationic surfactant or an amphoteric surfactant in combination or to use an anionic surfactant alone, and it is more preferred to use a nonionic surfactant and a cationic surfactant in combination.

The ratio of the nonionic surfactant to the cationic surfactant (nonionic surfactant/cationic surfactant) is preferably from 97/3 to 40/60 (mass ratio).

In a specific combination of a nonionic surfactant and a cationic surfactant, it is possible to reduce the total amount of the surfactants to a level of at most 5 mass % based on the copolymer (A) (100 mass %), whereby an adverse effect to the water repellency of an article can be reduced.

The nonionic surfactant is preferably at least one member selected from the group consisting of surfactants $s^1$ to $s^6$.
Surfactant $s^1$:

Surfactant $s^1$ is a polyoxyalkylene monoalkyl ether, a polyoxyalkylene monoalkenyl ether, a polyoxyalkylene monoalkapolyenyl ether or a polyoxyalkylene monopolyfluoroalkyl ether.

Surfactant $s^1$ is preferably a polyoxyalkylene monoalkyl ether, a polyoxyalkylene monoalkenyl ether or a polyoxyalkylene monopolyfluoroalkyl ether. As surfactant $s^1$, one type may be used alone, or two or more types may be used in combination.

As the alkyl, alkenyl, alkapolyenyl or polyfluoroalkyl group (hereinafter the alkyl, alkenyl, alkapolyenyl and polyfluoroalkyl groups may generally be referred to as a $R^s$ group), a $C_{4-26}$ group is preferred. The $R^s$ group may be linear or branched. The branched $R^s$ group is preferably a secondary alkyl group, a secondary alkenyl group or a secondary alkapolyenyl group. The $R^s$ group may have some or all of hydrogen atoms substituted by fluorine atoms.

A specific example of the $R^s$ group may, for example, be an octyl group, a dodecyl group, a tetradecyl group, a hexadecyl group, a stearyl group (an octadecyl group), a behenyl group (a docosyl group), an oleyl group (a 9-octadecenyl group), a heptadecylfluorooctyl group, a tridecylfluorohexyl group, a 1H,1H,2H,2H-tridecylfluorooctyl group or a 1H,1H,2H,2H-nonafluorohexyl group.

The polyoxyalkylene (hereinafter referred to as POA) chain is preferably a chain wherein at least two of a polyoxyethylene (hereinafter referred to as POE) chain and/or a polyoxypropylene (hereinafter referred to as POP) chain are linked. The POA chain may be a chain composed of one type of POA chain or a chain composed of two or more types of POA chains. When it is composed of two or more types of POA chains, the respective POA chains are preferably linked in a block form.

Surfactant $s_1$ is more preferably a compound ($s^{11}$).

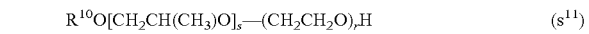

$$R^{10}O[CH_2CH(CH_3)O]_s-(CH_2CH_2O)_rH \quad (s^{11})$$

wherein $R^{10}$ is an alkyl group having at least 8 carbon atoms or an alkenyl group having at least 8 carbon atoms, r is an integer of from 5 to 50, and s is an integer of from 0 to 20. $R^{10}$ may be one wherein some of hydrogen atoms are substituted by fluorine atoms.

When r is at least 5, the surfactant becomes soluble in water and will be uniformly dissolved in an aqueous medium, whereby the penetrating property of the water/oil repellent composition to an article will be good. When r is at most 50, hydrophilicity will be suppressed, and the water repellency will be good.

When s is at most 20, the surfactant becomes soluble in water and will be uniformly dissolved in an aqueous medium, whereby the penetrating property of the water/oil repellent composition to an article will be good.

In a case where r and s are at least 2, the POE chains and the POP chains will be linked in a block form.

$R^{10}$ is preferably linear or branched.
r is preferably an integer of from 10 to 30.
s is preferably an integer of from 0 to 10.

The compound ($s^{11}$) may, for example, be the following compounds, whereby the POE chains and the POP chains are linked in a block form.

$C_{18}H_{37}O[CH_2CH(CH_3)O]_2$—$(CH_2CH_2O)_{30}H$,
$C_{18}H_{35}O$—$(CH_2CH_2O)_{30}H$,
$C_{16}H_{33}O[CH_2CH(CH_3)O]_5$—$(CH_2CH_2O)_{20}H$,
$C_{12}H_{25}O[CH_2CH(CH_3)O]_2$—$(CH_2CH_2O)_{15}H$,
$(C_8H_{17})(C_6H_{13})CHO$—$(CH_2CH_2O)_{15}H$,
$C_{10}H_{21}O[CH_2CH(CH_3)O]_2$—$(CH_2CH_2O)_{15}H$,
$C_6F_{13}CH_2CH_2O$—$(CH_2CH_2O)_{15}H$,
$C_6F_{13}CH_2CH_2O[CH_2CH(CH_3)O]_2$—$(CH_2CH_2O)_{15}H$,
$C_4F_9CH_2CH_2O[CH_2CH(CH_3)O]_2$—$(CH_2CH_2O)_{15}H$.

Surfactant $s^2$:

Surfactant $s^2$ is a nonionic surfactant made of a compound having at least one carbon-carbon triple bond and at least one hydroxy group in its molecule.

Surfactant $s^2$ is preferably a nonionic surfactant made of a compound having one carbon-carbon triple bond and one or two hydroxy groups in its molecule.

Surfactant $s^2$ may have a POA chain in its molecule. The POA chain may be a POE chain, a POP chain, a chain wherein a POE chain and a POP chain are randomly linked, or a chain wherein a POE chain and a POP chain are linked in a block form.

Surfactant $s^2$ is preferably compounds ($s^{21}$) to ($s^{24}$).

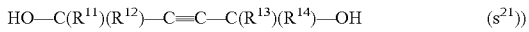   (s$^{21}$)

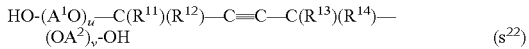   (s$^{22}$)

   (S$^{23}$)

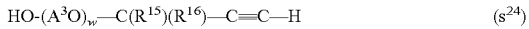   (s$^{24}$)

Each of $A^1$ to $A^3$ is an alkylene group.

Each of u and v is an integer of at least 0, and (u+v) is an integer of at least 1.

w is an integer of at least 1.

In a case where each of u, v and w is at least 2, each of $A^1$ to $A^3$ may be the same or different.

The POA chain is preferably a POE chain, a POP chain or a chain containing a POE chain and a POP chain. The number of repeating units of the POA chain is preferably from 1 to 50.

Each of $R^{11}$ to $R^{16}$ is a hydrogen atom or an alkyl group.

The alkyl group is preferably a $C_{1-12}$ alkyl group, more preferably a $C_{1-4}$ alkyl group. The alkyl group may, for example, be a methyl group, an ethyl group, a propyl group, a butyl group or an isobutyl group.

The compound ($s^{22}$) is preferably a compound ($s^{25}$):

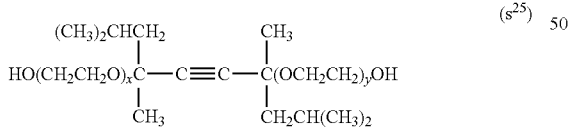   (s$^{25}$)

wherein each of x and y is an integer of from 0 to 100.

As the compound (s25), one type may be used alone, or two or more types may be used in combination.

The compound ($s^{25}$) is preferably a compound wherein x and y are 0, a compound wherein the sum of x and y is from 1 to 4 on average, or a compound wherein the sum of x and y is from 10 to 30 on average.

Surfactant $s^3$:

Surfactant $s^3$ is a nonionic surfactant made of a compound wherein a POE chain and a POA chain having at least two oxyalkylenes having at least 3 carbon atoms continuously linked, are linked, and both terminals are hydroxy groups.

Such a POA chain is preferably polyoxytetramethylene (hereinafter referred to as POT) and/or a POP chain.

Surfactant $s^3$ is preferably a compound ($s^{31}$) or a compound ($s^{32}$):

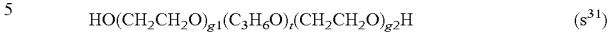   (s$^{31}$)

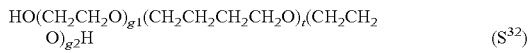   (S$^{32}$)

g1 is an integer of from 0 to 200.

t is an integer of from 2 to 100.

g2 is an integer of from 0 to 200.

When g1 is 0, g2 is an integer of at least 2. When g2 is 0, g1 is an integer of at least 2.

—$C_3H_6O$— may be —$CH(CH_3)CH_2$—, —$CH_2CH(CH_3)$—, or a mixture of —$CH(CH_3)CH_2$— and —$CH_2CH(CH_3)$—.

The POA chain is in a block-form.

Surfactant $s^3$ may, for example, be the following compounds:

HO—$(CH_2CH_2O)_{15}$—$(C_3H_6O)_{35}$—$(CH_2CH_2O)_{15}H$,
HO—$(CH_2CH_2O)_8$—$(C_3H_6O)_{35}$—$(CH_2CH_2O)_8H$,
HO—$(CH_2CH_2O)_{45}$—$(C_3H_6O)_{17}$—$(CH_2CH_2O)_{45}H$,
HO—$(CH_2CH_2O)_{34}$—$(CH_2CH_2CH_2CH_2O)_{28}$—$(CH_2CH_2O)_{34}H$.

Surfactant $s^4$:

Surfactant $s^4$ is a nonionic surfactant having an amine oxide moiety in its molecule.

Surfactant $s^4$ is preferably a compound ($s^{41}$):

   (s$^{41}$)

Each of $R^{17}$ to $R^{19}$ is a monovalent hydrocarbon group.

In the present invention, a surfactant having an amine oxide (N→O) is regarded as a nonionic surfactant.

As the compound ($s^{41}$), one type may be used alone, or two or more types may be used in combination.

The compound ($s^{41}$) is preferably a compound (s42) from the viewpoint of the dispersion stability of the copolymer (A).

   (s$^{42}$)

$R^{20}$ is a $C_{6-22}$ alkyl group, a $C_{6-22}$ alkenyl group, a phenyl group having a $C_{6-22}$ alkyl group bonded thereto, a phenyl group having a $C_{6-22}$ alkenyl group bonded thereto, or a $C_{6-13}$ fluoroalkyl group. $R^{20}$ is preferably a $C_{8-22}$ alkyl group, a $C_{8-22}$ alkenyl group or a $C_{4-9}$ polyfluoroalkyl group.

The compound ($s^{42}$) may, for example, be the following compounds:

$[H(CH_2)_{12}](CH_3)_2N(\rightarrow O)$,
$[H(CH_2)_{14}](CH_3)_2N(\rightarrow O)$,
$[H(CH_2)_{16}](CH_3)_2N(\rightarrow O)$,
$[H(CH_2)_{18}](CH_3)_2N(\rightarrow O)$,
$[F(CF_2)_6(CH_2)_2](CH_3)_2N(\rightarrow O)$,
$[F(CF_2)_4(CH_2)_2](CH_3)_2N(\rightarrow O)$.

Surfactant $s^5$:

Surfactant $s^6$ is a nonionic surfactant made of a polyoxyethylene mono(substituted phenyl)ether or its condensate.

The substituted phenyl group is preferably a phenyl group substituted by a monovalent hydrocarbon group, more preferably a phenyl group substituted by an alkyl group, an alkenyl group or a styryl group.

Surfactant $s^5$ is preferably a condensate of a polyoxyethylenemono(alkylphenyl)ether, a condensate of a polyoxethylenemono(alkenylphenyl)ether, a polyoxyethylenemono(alkylphenyl)ether, a polyoxyethylenemono(alkenylphenyl)ether or a polyoxyethylenemono[(alkyl)(styryl)phenyl]ether.

The polyoxyethylenemono(substituted phenyl)ether or its condensate may, for example, be a formaldehyde condensate of polyoxyethylenemono(nonylphenyl)ether, polyoxyethylenemono(nonylphenyl)ether, polyoxyethylenemono(octylphenyl)ether, polyoxyethylenemono(oleylphenyl)ether, polyoxyethylenemono[(nonyl)(styryl)phenyl]ether or polyoxyethylenemono[(oleyl)(styryl)phenyl]ether.

Surfactant $s^6$:

Surfactant $s^6$ is a nonionic surfactant made of a fatty acid ester of a polyol.

The polyol represents glycerol, sorbitan, sorbit, polyglycerin, polyethylene glycol, polyoxyethylene glyceryl ether, polyoxyethylenesorbitan ether or polyoxyethylenesorbit ether.

Surfactant $s^6$ may be a 1:1 (molar ratio) ester of stearic acid and polyethylene glycol, a 1:4 (molar ratio) ester of an ether of sorbit with polyethylene glycol and oleic acid, a 1:1 (molar ratio) ester of an ether of polyoxyethylene glycol with sorbitan and stearic acid, a 1:1 (molar ratio) ester of an ether of polyethylene glycol with sorbitan and oleic acid, a 1:1 (molar ratio) ester of dodecanoic acid and sorbitan, a 1:1 or 2:1 (molar ratio) ester of oleic acid and decaglycerol, or a 1:1 or 2:1 (molar ratio) ester of stearic acid and decaglycerol.

Surfactant $s^7$:

In a case where the surfactant contains a cationic surfactant, such a cationic surfactant is preferably surfactant $s^7$.

Surfactant $s^7$ is a cationic surfactant in a substituted ammonium salt form.

Surfactant $s^7$ is preferably an ammonium salt having at least one hydrogen atom bonded to the nitrogen atom substituted by an alkyl group, an alkenyl group or a POA chain having a terminal hydroxy group, more preferably a compound ($s^{71}$):

$[(R^{21})_4N^+].X^-$        ($s^{71}$)

$R^{21}$ is a hydrogen atom, a $C_{1-22}$ alkyl group, a $C_{2-22}$ alkenyl group, a $C_{1-9}$ fluoroalkyl group or a POA chain having a terminal hydroxy group. Four $R^{21}$ may be the same or different, provided that the four $R^{21}$ are not simultaneously hydrogen atoms.

$R^{21}$ is preferably a $C_{6-22}$ long chain alkyl group, a $C_{6-22}$ long chain alkenyl group or a $C_{1-9}$ fluoroalkyl group.

In a case where $R^{21}$ is an alkyl group other than the long chain alkyl group, $R^{21}$ is preferably a methyl group or an ethyl group.

In a case where $R^{21}$ is a POA chain having a terminal hydroxy group, the POA chain is preferably a POE chain.

$X^-$ is a counter ion.

$X^-$ is preferably a chlorine ion, an ethylsulfuric acid ion or an acetic acid ion.

The compound ($s^{71}$) may, for example, be monostearyl trimethylammonium chloride, monostearyldimethylmonoethylammonium ethylsulfate, mono(stearyl)monomethyldi(polyethylene glycol) ammonium chloride, monofluorohexyl trimethylammonium chloride, di(beef tallow alkyl)dimethylammonium chloride or dimethylmonococonutamine acetate.

Surfactant $s^8$:

In a case where the surfactant contains an amphoteric surfactant, such an amphoteric surfactant is preferably surfactant $s^8$.

Surfactant $s^8$ is an alanine, an imidazolinium betaine, an amide betaine or an acetic acid betaine.

The hydrophobic group is preferably a $C_{6-22}$ long chain alkyl group, a $C_{6-22}$ long chain alkenyl group or a $C_{1-9}$ fluoroalkyl group.

Surfactant $s^8$ may, for example, be dodecyl betaine, stearyl betaine, dodecylcarboxymethylhydroxyethylimidazolinium betaine, dodecyldimethylaminoacetic acid betaine or a fatty acid amide propyldimethylaminoacetic acid betaine.

Surfactant $s^9$:

As the surfactant, surfactant $s^9$ may be used.

Surfactant $s^9$ is a polymer surfactant made of a block copolymer or a random copolymer of a hydrophilic monomer with a hydrocarbon type hydrophobic monomer and/or a fluorinated hydrophobic monomer, or a hydrophobically modified product of a hydrophilic copolymer.

Surfactant $s^9$ may, for example, be a block or random copolymer of polyethylene glycol (meth)acrylate with a long chain alkyl acrylate, a block or random copolymer of polyethylene glycol (meth)acrylate with a fluoro(meth)acrylate, a block or random copolymer of vinyl acetate with a long chain alkyl vinyl ether, a block or random copolymer of vinyl acetate with a long chain alkyl vinyl ester, a polymer of styrene with maleic anhydride, a condensate of polyvinyl alcohol with stearic acid, a condensate of polyvinyl alcohol with stearyl mercaptan, a condensate of polyallylamine with stearic acid, a condensate of polyethyleneimine with stearyl alcohol, methylcellulose, hydroxypropyl methylcellulose or hydroxyethyl methylcellulose.

Commercial products of surfactant $s^9$ include, for example, MP polymer (Product No.: MP-103 or MP-203) manufactured by Kuraray corporation, SMA resins manufactured by Elf Atochem Inc, METOLOSE manufactured by Shin-Etsu Chemical Co., Ltd., EPOMIN RP manufactured by NIPPON SHOKUBAI Co., Ltd. and Surflon (Product No.: S-381 or S-393) manufactured by AGC Seimi Chemical Co., Ltd.

In a case where the medium is an organic solvent, or the mixing ratio of an organic solvent is large, surfactant $s^9$ is preferably surfactant $s^{91}$.

Surfactant $s^{91}$: A polymer surfactant made of a block copolymer or random copolymer of a lipophilic monomer with a fluorinated monomer (or its polyfluoroalkyl modified product).

Surfactant $s^{91}$ may, for example, be a copolymer of an alkyl acrylate with a fluoro(meth)acrylate, or a copolymer of an alkyl vinyl ether with a fluoroakyl vinyl ether.

Commercial products of surfactant $s^{91}$ include Surflon (Product No.: S-383 or SC-100 series) manufactured by AGC Seimi Chemical Co., Ltd.

As a combination of surfactants, from the viewpoint of excellent water repellency and durability of a water/oil repellent composition, and from the viewpoint of the stability of the obtained emulsion, a combination of surfactants $s^2$ and $s^7$, a combination of surfactants $s^1$, $s^3$ and $s^7$ or a combination of surfactants $s^1$, $s^2$, $s^3$ and $s^7$ is preferred, and such a combination wherein the surfactant $s^7$ is a compound ($s^{71}$) is more preferred.

The total amount of surfactants is preferably from 1 to 10 parts by mass, more preferably from 1 to 7 parts by mass, based on the copolymer (A) (100 parts by mass).

(Additives)

The additives include, for example, a penetrant, a defoamer, a water-absorbing agent, an antistatic agent, an antistatic polymer, an anticrease agent, a texture-adjusting agent, a film-forming assistant, a water-soluble polymer (such as polyacrylamide or polyvinyl alcohol), a thermosetting agent (such as a melamine resin, a urethane resin, a triazine ring-containing compound or an isocyanate-type compound), an epoxy curing agent (such as isophthalic acid dihydrazide, adipic acid dihydrazide, sebacic acid dihydrazide, dodecanedioic acid dihydrazide, 1,6-hexamethylenebis(N,N-dimethylsemicarbazide), 1,1,1',1'-tetramethyl-4,4'-(methylene-di-p-phenylene) disemicarbazide or spiroglycol), a thermosetting catalyst, a crosslinking catalyst, a synthetic resin, a fiber-stabilizer and inorganic fine particles.

Further, the water/oil repellent composition of the present invention may contain a copolymer capable of exhibiting water repellency and/or oil repellency (e.g. a commercially available water repellent, a commercially available oil repellent, a commercially available water/oil repellent or a commercially available SR (soil release) agent other than the copolymer (A) or a water-repellent compound having no fluorine atom, as the case requires. The water-repellent compound having no fluorine atom may, for example, be a paraffin type compound, an aliphatic amide type compound, an alkylethylene urea compound or a silicone compound.

(Method for Producing Water/oil Repellent Composition)

The water/oil repellent composition of the present invention is produced by the following method (i) or (ii):

(i) A method which comprises polymerizing a monomer mixture comprising the monomer (a) and the monomer (b) and further containing the monomer (c) and the monomer (d) as the case requires, in a medium in the presence of a surfactant and a polymerization initiator to obtain a solution, dispersion or emulsion of the copolymer (A), and adding another medium, another surfactant and additives, as the case requires.

(ii) A method which comprises polymerizing a monomer mixture comprising the monomer (a) and the monomer (b) and further containing the monomer (c) and the monomer (d) as the case requires, in a medium in the presence of a surfactant and a polymerization initiator, to obtain a solution, dispersion or emulsion of the copolymer (A), then separating the copolymer (A) and adding a medium, a surfactant and, if required, additives, to the copolymer (A).

The polymerization method may, for example, be a dispersion polymerization method, an emulsion polymerization method or a suspension polymerization method, and emulsion polymerization is preferred. Further, it may be polymerization all at once or multistage polymerization.

The method for producing a water/oil repellent composition is preferably a method wherein a monomer mixture comprising the monomer (a) and the monomer (b) and further containing the monomer (c) and the monomer (d) as the case requires, is polymerized by emulsion polymerization in an aqueous medium in the presence of a surfactant and a polymerization initiator to obtain an emulsion of the copolymer (A).

With a view to improving the yield of the copolymer, it is preferred to pre-emulsify the mixture comprising the monomers, the surfactant and the aqueous medium, prior to the emulsion polymerization. For example the mixture comprising the monomers, the surfactant and the aqueous medium is mixed and dispersed by a homomixer or a high pressure emulsifier.

The polymerization initiator may, for example, be a thermal polymerization initiator, a photopolymerization initiator, a radiation polymerization initiator, a radical polymerization initiator or an ionic polymerization initiator, and a water-soluble or oil-soluble radical polymerization initiator is preferred.

As the radical polymerization initiator, a common initiator such as an azo type polymerization initiator, a peroxide type polymerization initiator or a redox type initiator is employed depending upon the polymerization temperature. As the radical polymerization initiator, an azo type compound is particularly preferred, and in a case where polymerization is carried out in an aqueous medium, a salt of an azo type compound is more preferred. The polymerization temperature is preferably from 20 to 150° C.

The amount of the polymerization initiator is preferably from 0.1 to 5 parts by mass, more preferably from 0.1 to 3 parts by mass, per 100 parts by mass of the monomer mixture.

At the time of polymerization of the monomer mixture, a molecular weight-controlling agent may be employed. The molecular weight controlling agent is preferably an aromatic compound, a mercapto alcohol or a mercaptan, particularly preferably an alkylmercaptan. The molecular weight-controlling agent may, for example, be mercaptoethanol, n-octylmercaptan, n-dodecylmercaptan, t-dodecylmercaptan, stearylmercaptan or α-methylstyrene dimer ($CH_2$=$C(Ph)$ $CH_2C(CH_3)_2Ph$ wherein Ph is a phenyl group).

The amount of the molecular weight-controlling agent is preferably from 0 to 5 parts by mass, more preferably from 0 to 3 parts by mass, per 100 parts by mass of the monomer mixture.

Otherwise, the monomer mixture may be polymerized in the presence of a polyfunctional mercapto compound such as diethylene glycol bis(3-mercaptobutyrate), pentaerythritol tetrakis(3-mercaptobutyrate), 2,4,6-trimercaptotriazine or 1,3,5-tris(3-mercaptobutyloxyethyl)-1,3,5-triazine-2,4,6 (1H,3H,5H)-trione.

From the viewpoint of the dynamic water repellency and the post-air-drying water repellency, the proportion of the monomer (a) is preferably from 20 to 99 mass %, more preferably from 40 to 95 mass %, particularly preferably from 60 to 90 mass %, based on the monomer mixture (100 mass %).

From the viewpoint of the dynamic water repellency and the post-air-drying water repellency, the proportion of the monomer (b) is preferably from 1 to 80 mass %, more preferably from 5 to 60 mass %, particularly preferably from 10 to 40 mass %, based on the monomer mixture (100 mass %).

The proportion of the monomer (c) is preferably from 0 to 20 mass % based on the monomer mixture (100 mass %), and from the viewpoint of the abrasion durability, it is more preferably from 1 to 10 mass %, particularly preferably from 1 to 5 mass %.

The proportion of the monomer (d) is preferably from 0 to 10 mass %, more preferably from 0 to 5 mass %, based on the monomer mixture (100 mass %).

In the water/oil repellent composition of the present invention, it is preferred that the copolymer (A) is dispersed in the form of particles in the medium. The average particle size of the copolymer (A) is preferably from 10 to 1,000 nm, more preferably from 10 to 300 nm, particularly preferably from 10 to 250 nm. When the average particle size is within such a range, it will be unnecessary to use a surfactant, a dispersant, etc. in a large amount, the water repellency will be good, and when dyed cloths are treated, no color fading will result, and the dispersed particles can stably be present in the medium without precipitation. The average particle size of the copolymer (A) can be measured by e.g. a dynamic light-scattering apparatus or an electron microscope.

Immediately after the production of the water/oil repellent composition, the solid content concentration of the emulsion is preferably from 20 to 40 mass % based on the emulsion (100 mass %). Here, the solid content concentration is a concentration including an emulsifier in addition to the copolymer (A). The content of the copolymer (A) in the emulsion is preferably from 18 to 40 mass % immediately after the production of the water/oil repellent composition.

At the time of treating an article, the solid content concentration of the water/oil repellent composition of the present invention is preferably from 0.2 to 5 mass % in the water/oil repellent composition (100 mass %).

The solid content concentration of the emulsion or the water/oil repellent composition is calculated from the mass of the emulsion or the water/oil repellent composition-before heating and the mass after drying for 4 hours by a counter current canal dryer at 120° C.

The water/oil repellent composition of the present invention as described in the foregoing, contains the copolymer which has structural units based on the monomer (a) and structural units based on the monomer (b) and which has a mass average molecular weight of at least 40,000, whereby it is possible to impart sufficient dynamic water repellency and post-air-drying water repellency to the surface of an article.

That is, in order that a coating film containing a copolymer formed on the surface of an article have sufficient water/oil repellency, it is required that the coating film is homogenous as far as possible. A conventional water/oil repellent composition makes it possible to form a homogeneous coating film even on an article having a complicated shape, such as fibers, by reducing the molecular weight of the copolymer thereby to lower the melt viscosity of the copolymer at the time of the high-temperature curing carried out to obtain the performance. However, in a case where the copolymer contained in the coating film has structural units based on the monomer (a), if the molecular weight of the copolymer is low, the durability of the coating film will be decreased. A decrease in the durability i.e. the strength of the coating film is remarkable particularly when the molecular weight of the polymer is lower than the critical molecular weight. A composition which has been used as a water/oil repellent is considered to have a molecular weight significantly lower than the critical molecular weight expected from the backbone of the copolymer. By the increase in the molecular weight of the copolymer, an improvement in the strength of the coating film is expected, however, at the same time, an increase in the melt viscosity of the copolymer at the curing temperature, i.e. a decrease in the film-forming property is a concern.

The present inventors have found that the dynamic water repellency and the post-air-drying water repellency are insufficient due to the decrease in the durability of the coating film. To solve this problem, they have accomplished an increase in the molecular weight of the copolymer while suppressing a decrease in the film-forming property, by the copolymer having structural units based on the monomer (b) which are structural units to decrease Tg of the copolymer as essential structural units, so that a homogeneous coating film can be formed even if the molecular weight of the copolymer is increased, and they have accomplished the present invention.

Further, by the water-oil repellent composition of the present invention, the content (content in a case where the solid content concentration is 20%) of perfluorooctanoic acid (PFOA) and perfluorooctanesulfonic acid (PFOS), and their precursors and analogs, of which the effects on the environment are pointed out, can be reduced to a level of not higher than the detection limit as an analytical value of LC-MS/MS by the method disclosed in Japanese Patent Application No. 2007-333564.

Further, for the water/oil repellent treatment on the fibers or the like, a crosslinking agent such as a melamine or an isocyanate is used in combination to secure the durability of the coating film in many cases. However, in the present invention, the durability of the polymer is improved by the increase in the molecular weight, whereby no crosslinking agent is required, or the amount of its use can be remarkably reduced.

<Method for Treating Article>

The method for treating an article of the present invention is characterized by treating an article with a treating liquid containing the water/oil repellent composition of the present invention.

Articles to be treated include, for example, fibers (natural fibers, synthetic fibers, mixed fibers, etc.), various fiber products, nonwoven fabrics, resins, paper, leather, metals, stones, concrete, gypsum and glass.

The treating method may, for example, be a method of coating an article with a coating liquid containing the water/oil repellent composition by a known coating method, followed by drying, or a method of impregnating an article with a coating liquid containing the water/oil repellent composition, followed by drying.

The treating liquid preferably further contains a film-forming assistant with a view to forming a homogenous coating film.

The method of adding the film-forming assistant may, for example, be a method of adding it to the medium when the copolymer (A) is produced, a method of adding it to an emulsion of the copolymer (A), or a method of adding it together with other additives to a liquid having the emulsion of the copolymer (A) diluted.

In view of a high effect of improving the film-forming property, the film-forming assistant is preferably one having a boiling point higher than that of the medium used for the water/oil repellent composition, more preferably one having a boiling point close to the temperature when the article is treated.

The film-forming assistant is preferably a water-soluble organic solvent in view of easiness of addition to the aqueous medium.

As the film-forming assistant, the following may be mentioned.

Methyl glycol, 2-ethoxyethanol, isopropyl glycol, butyl glycol, butyl cellosolve, allyl glycol, dimethyl glycol, isobutyl glycol, methyldiglycol, butyldiglycol, isobutyldiglycol, benzylglycol, dimethyldiglycol, ethylcarbitol acetate, methyltriglycol, methyltriglycol, butyltriglycol, dimethyltriglycol, methylpolyglycol, methylpropylene glycol, methylpropylene triglycol, propylpropylene glycol, methylpropylene diglycol, ethylene glycol monomethyl ether, ethylene glycol monoethyl ether, ethylene glycol monoisopropyl ether, ethylene glycol butyl ether, ethylene glycol monoisobutyl ether, ethylene glycol monoallyl ether, ethylene glycol dimethyl ether, diethylene glycol monomethyl ether, diethylene glycol monobutyl ether, diethylene glycol monoisobutyl ether, diethylene glycol monobenzyl ether, diethylene glycol dimethyl ether, diethylene glycol diethyl ether, diethylene glycol monoethyl ether acetate, triethylene glycol monomethyl ether, triethylene glycol monobutyl ether, triethylene glycol dimethyl ether, polyethylene glycol monomethyl ether, propylene glycol monomethyl ether, propylene glycol monopropyl ether, dipropylene glycol, dipropylene glycol monomethyl ether, tripropylene glycol, tripropylene glycol monomethyl ether, etc.

The amount of the film-forming assistant is preferably from 10 to 200 mass % based on the solid content concentration of the emulsion. In a case where the solvent used for the polymerization functions as the film-forming assistant, the amount including the solvent as the film-forming assistant is preferably within the above range.

Further, after the method for treating an article of the present invention is carried out, antistatic finish, softening finish, antibacterial finish, deodorant finish or waterproofing finish may, for example, be carried out.

The waterproofing finish may be processing to provide a waterproofing film. The waterproofing film may, for example, be a porous film made of an urethane resin or an acrylic resin, a non-porous film made of an urethane resin or an acrylic resin, a polytetrafluoroethylene film or a moisture-proofing film made of a combination thereof.

By treating an article by means of the water/oil repellent composition of the present invention, it is possible to impart high quality water/oil repellency to the article. Further, it is possible to impart excellent adhesion to the substrate surface and to impart the water/oil repellency even by curing at a low temperature. Further, it is possible to maintain the performance at the initial stage of the processing stably without substantial deterioration of the performance by abrasion or washing. Further, when paper is treated, it is possible to impart an excellent sizing property and water/oil repellency to the paper even under a low temperature drying condition. In a case where it is applied to the surface of a resin, glass or a metal, it is possible to form a water/oil repellent coating film which is excellent in the adhesion to the article and which is excellent in the film-forming property.

EXAMPLES

Now, the present invention will be described in detail with reference to Examples, but it should be understood that the present invention is by no means thereby restricted.

<Physical Properties of Copolymer>

With respect to a copolymer recovered by the following recovery method, its molecular weight was measured.

(Recovery Method)

6 g of an emulsion was dropped into 60 g of 2-propanol (hereinafter referred to as IPA), followed by stirring to precipitate solid. After carrying out centrifugal separation at 3,000 rpm for 5 minutes, the obtained solid was decanted. 12 g of IPA was again added, followed by thorough stirring. After carrying out centrifugal separation at 3,000 rpm for 5 minutes, the obtained solid was separated from the supernatant, followed by vacuum drying at 35° C. overnight to obtain a copolymer.

(Molecular Weight)

The recovered copolymer was dissolved in a mixed solvent of a fluorinated solvent (manufactured by Asahi Glass Company, Limited, AK-225)/THF=(6/4 volume ratio) to obtain a 1 mass % solution, which was passed through a 0.2 μm filter to obtain a sample for analysis. With respect to the sample, the number average molecular weight(Mn) and the mass average molecular weight(Mw) were measured. The conditions for the measurement were as follows.

Apparatus: HLC-8220GPC manufactured by TOSOH CORPORATION

Column: One having MIXED-C and 100A manufactured by Polymer Laboratories connected in series.

Measuring temperature: 37° C.
Injected amount: 50 μL
Outflow rate: 1 mL/min
Standard sample: EasiCal PM-2 manufactured by Polymer Laboratories
Eluent: mixed solvent of a fluorinated solvent (manufactured by Asahi Glass Company, Limited, AK-225)/THF=6/4 (volume ratio)<

<Evaluation of Test Cloth>

(Oil Repellency)

With respect to a test cloth, the oil repellency was evaluated in accordance with the test method in AATCC-TM118-1966. The oil repellency is represented by grades shown in Table 1. A grade having +(-) attached, shows that the property is slightly better (worse).

TABLE 1

| Oil repellency No. | Test solution | Surface tension mN/m (25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 Parts of nujol/ 35 parts of hexadecane | 29.6 |
| 1 | Nujol | 31.2 |
| 0 | Less than 1 | — |

(Water Repellency)

With respect to a test cloth, the water repellency was evaluated in accordance with the spray test in JIS L1092-1992. The water repellency is represented by five grades of from 1 to 5. Here, the higher the grade number, the better the water repellency. One with grade 3 or higher is regarded as exhibiting water repellency. A grade having +(-) attached shows that the property is slightly better (worse) than the standard property of that grade.

(Washing Durability)

With respect to a test cloth, washing was repeated 20 times in accordance with the water washing method in JIS L0217 Appendix 103. After the washing, it was dried in air overnight in a room having a room temperature of 25° C. under a humidity of 60%, whereupon the water repellency was evaluated as described above.

(Dynamic Water Repellency)

With respect to a test cloth, in accordance with the method (Bundesmann test) disclosed in JIS L1092 method (C), a rainfall test was carried out under such conditions that the amount of rainfall was 100 cc/min, the water temperature of rainfall was 20° C. and the time for rainfall was 10 minutes, whereby the water repellency was evaluated. The water repellency was represented by five grades of from 1 to 5. Here, the larger the grade number, the better the water repellency. One with grade 3 or higher is regarded as exhibiting water repellency. A grade having +(-) attached, shows that the property is slightly better (worse).

(Washing Durability)

With respect to a test cloth, washing was repeated 5 times in accordance with the water washing method in JIS L0217 Appendix 103. After the washing, it was dried in air overnight in a room having a room temperature of 25° C. under a humidity of 50%, whereupon the dynamic water repellency was evaluated as described above.

(Abbreviations)

Monomer (a):
  C6FMA: $C_6F_{13}C_2H_4OC(O)C(CH_3)=CH_2$
Monomer (b):
  VdCl: Vinylidene chloride
Monomer (c):
  HEMA: 2-Hydroxyethyl methacrylate
Monomer (d):
  VCM: Vinyl chloride (Tg of homopolymer: 85° C.)
  BD: 1,4-Butadiene (Tg of homopolymer: −80° C.)
Surfactant s[1]:
  PEO-20: 10 Mass %-aqueous solution of polyoxyethylene oleyl ether (Emulgen E430 manufactured by Kao Corporation, about 26 mol adduct of ethylene oxide)

SFY465: 10 Mass % aqueous solution of 2,4,7,9-tetramethyl-5-decyn-4,7-diolethylene oxide adduct (Surfynol 465 manufactured by Nissin Chemical Industry Co., Ltd., added mols of ethylene oxide: 10)
Surfactant s7:
  TMAC: 10 Mass % aqueous solution of trimethylammonium chloride (ARQUAD 18-63 manufactured by Lion Corporation)
  STMC: 10 Mass % aqueous solution of monostearyl trimethylammonium chloride
Surfactant s3:
  P-204: 10 Mass % aqueous solution of ethylene oxide propylene oxide polymer (PRONONE 204 manufactured by NOF Corporation, proportion of ethylene oxide: 40 mass %)
Molecular weight-controlling agent:
  nDOSH: n-Dodecylmercaptan
Polymerization initiator:
  VA-061A: 10 Mass % aqueous solution of an acetate of 2,2'-azobis[2-(2-imidazolin-2-yl)propane] (VA-061 manufactured by Wako Pure Chemical Industries, Ltd.)
Medium:
  DPG: Dipropylene glycol
  Water: Deionized water Example 1

Into a glass beaker, 230.9 g of C6FMA, 2.9 g of HEMA, 7.2 g of PEO-20, 1.4 g of STMC, 1.4 g of TMAC, 86.6 g of DPG and 447.4 g of water were introduced, then heated at 55° C. for 30 minutes and mixed by means of a homomixer (Biomixer manufactured by NIHONSEIKI KAISHA LTD.) to obtain a mixed liquid.

The obtained mixed liquid was treated at 40 MPa by means of a high pressure emulsifying machine (Mini-Lab manufactured by APV Rannie) while maintaining the temperature at 50° C. to obtain an emulsified liquid. The obtained emulsified liquid was put into a glass reactor and cooled to a temperature of at most 30° C. 54.8 g of VdCl and 1.4 g of VA-061A were added, and the vapor phase was substituted by nitrogen, and a polymerization reaction was carried out at 65° C. for 15 hours with stirring, to obtain an emulsion of a copolymer. The proportions of structural units based on the respective monomers are shown in Table 2. Further, the molecular weights are shown in Table 3.

Example 2 and Comparative Examples 1 to 6

Emulsions of copolymers were obtained in the same manner as in Example 1 except that the charged amounts of the respective raw materials were changed. The proportions of structural units based on the respective monomers are shown in Table 2. Further, the molecular weights are shown in Table 3.

TABLE 2

| Structural units (mass %) | (a) C6FMA | (d) VCM | (b) VdCl | (d) BD | (c) HEMA | n-DoSH |
|---|---|---|---|---|---|---|
| Ex. 1 | 80 | | 19 | | 1 | 0 |
| Ex. 2 | 80 | | 19 | | 1 | 0.2 |
| Comp. Ex. 1 | 80 | | 19 | | 1 | 1 |
| Comp. Ex. 2 | 79 | 20 | | | 1 | 1 |
| Comp. Ex. 3 | 59 | 40 | | | 1 | 1 |
| Comp. Ex. 4 | 91.5 | | | 6.5 | 2 | 1 |
| Comp. Ex. 5 | 85 | | 12 | | 3 | 1 |
| Comp. Ex. 6 | 85 | | 12 | | 3 | 0 |

TABLE 3

| | Molecular weight | | |
|---|---|---|---|
| | Mn | Mw | Mw/Mn |
| Ex. 1 | 90200 | 242000 | 2.70 |
| Ex. 2 | 45700 | 83100 | 1.82 |
| Comp. Ex. 1 | 24200 | 34400 | 1.42 |
| Comp. Ex. 2 | Not dissolved due to high molecular weight. | | |
| Comp. Ex. 3 | | | |
| Comp. Ex. 4 | 29100 | 228000 | 7.85 |
| Comp. Ex. 5 | 34900 | 213000 | 6.11 |
| Comp. Ex. 6 | 73900 | 390000 | 5.28 |

<Evaluation of Test Cloth>

The emulsion of a copolymer in each of Examples 1 and 2 and Comparative Examples 1 to 6 was diluted with distilled water to adjust the solid content concentration to be 1.0 mass %, and then a trimethylolmelamine resin (BECKAMINE M-3 manufactured by DIC Corporation) as a thermosetting agent and an organic amine salt catalyst (Catalyst ACX manufactured by DIC Corporation) as a thermosetting catalyst were added so that the respective concentrations became 0.3 mass %, and further, a blocked isocyanate (Meikanate TP-10 manufactured Meisei Chemical Works, Ltd.) as an adjuvant for combined use was added so that the concentration became 0.75 mass %, and didpropylene glycol as a film-forming assistant was added so that the concentration became 1 mass % to obtain a water/oil repellent composition.

In the water/oil repellent composition, a dyed nylon cloth was dipped and squeezed so that the wet pickup became 42 mass %. The wet cloth was dried at 110° C. for 90 seconds and then dried at 170° C. for 60 seconds to obtain a test cloth. With respect to the test cloth, the water repellency (post-air-drying water repellency), the oil repellency and the dynamic water repellency were evaluated. The results are shown in Table 4.

TABLE 4

| | Evaluation | | | | |
|---|---|---|---|---|---|
| | Oil repellency | Water repellency | | Bundesmann test | |
| Washing times | — | — | 20 | — | 5 |
| Ex. 1 | 6 | 5 | 5 | 5 | 4− |
| Ex. 2 | 5 | 5 | 4+ | 5− | 3− |
| Comp. Ex. 1 | 5 | 5 | 4 | 4+ | 2+ |
| Comp. Ex. 2 | 6− | 5 | 4.5 | 3.5 | 2.5 |
| Comp. Ex. 3 | 4 | 5− | 4− | 3+ | 2.5 |
| Comp. Ex. 4 | 6 | 5 | 4− | 3+ | 2.5 |
| Comp. Ex. 5 | 3 | 3− | 2 | 1 | 1 |
| Comp. Ex. 6 | 3 | 3− | 2 | 1 | 1 |

Industrial Applicability

The water/oil repellent composition of the present invention is useful as a water/oil repellent agent for e.g. fiber products (clothing (sports wears, coats, jumpers, work clothes, uniforms, etc.), bags, industrial materials, etc.), nonwoven fabrics, leather products, stone materials, concrete building materials, etc. Further, it is useful as a coating agent for filtration material or as a surface protective agent. Further, it is useful also for an application wherein it is mixed with e.g. polypropylene or nylon, followed by molding or forming into fibers to impart water/oil repellency.

This application is a continuation of PCT Application No. PCT/JP2010/057100, filed Apr. 21, 2010, which is based upon and claims the benefit of priority from Japanese Patent Application 2009-105228 filed on Apr. 23, 2009. The contents of those applications are incorporated herein by reference in its entirety.

What is claimed is:

1. A water/oil repellent composition which comprises a copolymer having structural units based on the following monomer (a) and structural units based on the following monomer (b) and having a mass average molecular weight of at least 40,000, and a medium:

monomer (a): a compound represented by the following formula (1):

$$(Z-Y)_n X \quad (1)$$

wherein Z is a $C_{1-6}$ polyfluoroalkyl group or a group represented by the following formula (2), Y is a bivalent organic group or a single bond, n is 1 or 2, and X is, when n is 1, any one of the groups represented by the following formulae (3-1) to (3-5) and, when n is 2, any one of the groups represented by the following formulae (4-1) to (4-4):

$$C_i F_{2i+1} O(CFX^1 CF_2 O)_j CFX^2— \quad (2)$$

wherein i is an integer of from 1 to 6, j is an integer of from 0 to 10, and each of $X^1$ and $X^2$ is a fluorine atom or a trifluoromethyl group;

$$—CR=CH_2 \quad (3\text{-}1)$$

$$—C(O)OCR=CH_2 \quad (3\text{-}2)$$

$$—OC(O)CR=CH_2 \quad (3\text{-}3)$$

$$—OCH_2—\phi—CR=CH_2 \quad (3\text{-}4)$$

$$—OCH=CH_2 \quad (3\text{-}5)$$

wherein R is a hydrogen atom, a methyl group or a halogen atom, and $\phi$ is a phenylene group;

$$—CH[—(CH_2)_m CR=CH_2]— \quad (4\text{-}1)$$

$$—CH[—(CH_2)_m C(O)OCR=CH_2]— \quad (4\text{-}2)$$

$$—CH[—(CH_2)_m OC(O)CR=CH_2]— \quad (4\text{-}3)$$

$$—OC(O)CH=CHC(O)O— \quad (4\text{-}4)$$

where R is a hydrogen atom, a methyl group or a halogen atom, and m is an integer of from 0 to 4;

monomer (b): an olefin, a homopolymer of which has a glass transition temperature of from −50 to 50° C.

2. The water/oil repellent composition according to claim 1, wherein the copolymer further has structural units based on the following monomer (c):

monomer (c): a monomer having no polyfluoroalkyl group and having a crosslinkable functional group.

3. The water/oil repellent composition according to claim 1, wherein the molecular weight of the monomer (b) is at most 150.

4. The water/oil repellent composition according to claim 1, wherein the monomer (a) is a (meth)acrylate having a $C_{4-6}$ perfluoroalkyl group.

5. A method for producing a water/oil repellent composition, which comprises polymerizing a monomer mixture comprising the following monomer (a) and the following monomer (b) in a medium in the presence of a surfactant and a polymerization initiator to obtain a copolymer having a mass average molecular weight of at least 40,000:

monomer (a): a compound represented by the following formula (1):

$$(Z-Y)_n X \quad (1)$$

wherein Z is a $C_{1-6}$ polyfluoroalkyl group or a group represented by the following formula (2), Y is a bivalent organic group or a single bond, n is 1 or 2, and X is, when n is 1, any one of the groups represented by the following formulae (3-1) to (3-5) and, when n is 2, any one of the groups represented by the following formulae (4-1) to (4-4):

$$C_i F_{2i+1} O(CFX^1 CF_2 O)_j CFX^2— \quad (2)$$

wherein i is an integer of from 1 to 6, j is an integer of from 0 to 10, and each of $X^1$ and $X^2$ is a fluorine atom or a trifluoromethyl group;

$$—CR=CH_2 \quad (3\text{-}1)$$

$$—C(O)OCR=CH_2 \quad (3\text{-}2)$$

$$—OC(O)CR=CH_2 \quad (3\text{-}3)$$

$$—OCH_2—\phi—CR=CH_2 \quad (3\text{-}4)$$

$$—OCH=CH_2 \quad (3\text{-}5)$$

wherein R is a hydrogen atom, a methyl group or a halogen atom, and $\phi$ is a phenylene group;

$$—CH[—(CH_2)_m CR=CH_2]— \quad (4\text{-}1)$$

$$—CH[—(CH_2)_m C(O)OCR=CH_2]— \quad (4\text{-}2)$$

$$—CH[—(CH_2)_m OC(O)CR=CH_2]— \quad (4\text{-}3)$$

$$—OC(O)CH=CHC(O)O— \quad (4\text{-}4)$$

where R is a hydrogen atom, a methyl group or a halogen atom, and m is an integer of from 0 to 4;

monomer (b): an olefin, a homopolymer of which has a glass transition temperature of from −50 to 50° C.

6. The method for producing a water/oil repellent composition according to claim 5, wherein the monomer mixture further contains the following monomer (c):

monomer (c): a monomer having no polyfluoroalkyl group and having a crosslinkable functional group.

7. The method for producing a water/oil repellent composition according to claim 5, wherein the molecular weight of the monomer (b) is at most 150.

8. The method for producing a water/oil repellent composition according to claim 5, wherein the monomer (a) is a (meth)acrylate having a $C_{4-6}$ perfluoroalkyl group.

9. A method for treating an article, which comprises treating an article with a treating liquid containing the water/oil repellent composition as defined in Claim 1.

10. The method for treating an article according to claim 9, wherein the treating liquid further contains a film-forming assistant.

11. The method for treating an article according to claim 10, wherein the film-forming assistant is a water-soluble organic solvent having a boiling point higher than that of the medium.

* * * * *